United States Patent [19]

Simon et al.

[11] Patent Number: 5,707,759
[45] Date of Patent: Jan. 13, 1998

US005707759A

[54] ANODE FOR A RECHARGEABLE LITHIUM CELL AND A METHOD OF MANUFACTURING IT

[75] Inventors: Bernard Simon, Issy Les Moulineaux; Jean-Pierre Boeuve, Marcoussis, both of France

[73] Assignee: SAFT, Romainville, France

[21] Appl. No.: 522,820

[22] Filed: Sep. 6, 1995

[30] Foreign Application Priority Data

Sep. 5, 1995 [FR] France ................. 95 10389

[51] Int. Cl.$^6$ .................................................. H01M 4/62
[52] U.S. Cl. ........................ 429/217; 429/218; 29/623.1
[58] Field of Search ................................ 429/217, 218; 29/623.1

[56] References Cited

U.S. PATENT DOCUMENTS

| | | | |
|---|---|---|---|
| 3,617,388 | 11/1971 | Matsuda et al. | 429/40 |
| 5,415,958 | 5/1995 | Takahashi et al. | 429/217 |
| 5,478,674 | 12/1995 | Miyasaka et al. | 429/218 |
| 5,527,643 | 6/1996 | Sonobe et al. | 429/218 |

*Primary Examiner*—Bruce F. Bell
*Attorney, Agent, or Firm*—Sughrue, Mion, Zinn, Macpeak & Seas, PLLC

[57] ABSTRACT

The invention concerns an anode for a rechargeable lithium cell, comprising a conductive support and a paste containing an electrochemically active material into which lithium can be inserted and a polymer binder, the anode being characterized in that the binder is selected from polyvinyl alcohol, polyvinyl butyral, and copolymers and mixtures thereof.

28 Claims, 2 Drawing Sheets

ANODE FOR A RECHARGEABLE LITHIUM CELL AND A METHOD OF MANUFACTURING IT

The present invention concerns an anode for use in a rechargeable lithium cell which includes an organic electrolyte. It also concerns a method of manufacturing this anode.

Most cell electrodes today are composed of a support on which a paste is deposited which contains the active material and a polymeric binder. The binder ensures cohesion of the grains of active material both to one another and to the electrode support before assembly of the cell and during operation.

A high power electrode must have as large an electrochemically active surface area as possible. The active materials used in a cell electrode have a surface area of less than 50 m$^2$/g, usually of the order of 10 m$^2$/g. In addition, the electrochemically active surface area which is accessible to the electrolyte depends on the manner in which the grains of active material are coated and bound by the polymer. It is thus essential to minimize the inevitable loss of capacity resulting from manufacture of the electrode. The smallest possible amount of binder which is necessary but sufficient to ensure cohesion must be introduced into the electrode. Still further, if the electrode is insufficiently wetted by the electrolyte, the active surface area will be reduced. This causes an increase in local current density and a lower charged capacity. The wettability of the electrode depends on the nature of the binder used.

The latest rechargeable lithium cells have an anode which includes a material constituting a host structure into which the lithium inserts itself then frees itself during cycling. Dimensional variations occur in the electrode during cycling which the binder must be capable of following in order to avoid disintegration. When charged, the anode is at a potential close to that of lithium (less than 0.5 V/Li). In this zone where the potential is highly reducing and where the electrolyte is unstable, the anode is passivated by the electrolyte reduction product. The anode potential on discharging can reach high values of more than 2 V/Li. The binder must have as low a reactivity as possible, as regards both reduction and oxidation, in order to be able to support such extreme operating conditions without disintegrating.

An aqueous solution of a polymer such as polytetrafluoroethylene (PTFE) is generally used in the manufacture of cell electrodes. However, the particular texture of an electrode comprising a metal grid supporting grains of active material bound by PTFE fibrils makes the production of thin electrodes for use in cells with a high power per unit volume very difficult. In addition, the anti-adhesive properties of PTFE do not allow a thin support such as a strip to be used.

More recently, a method of preparing electrodes has been developed, consisting of dissolving the polymer in a volatile organic solvent. The polymers which have been used so far for this application are mainly polyvinylidene fluoride (PVDF), polyvinyl chloride (PVC), ethylene-propylene-diene terpolymer with a methylene main chain (EPDM), elastomers (SBS, . . . ), and cellulose binders.

The paste comprising the active material and the polymer solution is coated onto a thin metal strip, producing thin dense electrodes. A cross-linking step may be necessary to ensure that the polymer is insoluble in the organic electrolyte. Problems arise with this due to the toxicity of the solvents used and the cost and safety measures connected with recycling a large volume of solvent. Further, those polymers are generally unstable at the highly reducing potentials attained when charging lithium cells; in addition, they do not adhere well to the metal strips.

Attention has thus turned to polymers which can form an aqueous solution, such as polyvinylpyrrolidone (PVP), polyethylene oxide PEO and polyethyleneimine. However, those polymers are highly soluble in the organic electrolyte.

The present invention relates to a rechargeable lithium cell with high performance and which is easy to manufacture, where the binder can operate in non aqueous media over a wide range of potential.

The present invention thus provides an anode for a rechargeable lithium cell, comprising a conductive support and a paste containing an electrochemically active material into which lithium can be inserted and a polymer binder, the anode being characterized in that said binder is a vinyl polymer selected from polyvinyl alcohol (PVA) with formula (—CH$_2$—CHOH—)$_n$, polyvinyl butyral (PVB) and copolymers and mixtures thereof.

The anode is in the form of a flexible, coherent layer containing the active material and the binder, and adhering to a current collector support. These polymers possess the properties of a conventional binder; they also have the advantage of adhering strongly to metallic surfaces and being soluble in aqueous or in hydroalcoholic media. Their primary importance is that they are compatible with the severe operating conditions encountered in a lithium cell since they have moderate reactivity as regards lithium. Anode performance is maintained over long periods as they can tolerate alternating highly reducing then highly oxidizing potentials without being altered.

In a preferred embodiment, the binder is a copolymer of polyvinyl alcohol and polyvinyl butyral in which the quantity of polyvinyl alcohol is in the range 5% to 30% by weight. PVB is manufactured from PVA by the action of butyric aldehyde. It is thus difficult to obtain PVB alone. The presence of PVA in amounts of less than 30% facilitates the formation of a hydroalcoholic PVB solution while retaining high chemical inertness as regards the electrolyte.

The proportion of binder is in the range 1% to 20% by weight, preferably in the range 5% to 20% by weight of the paste. This quantity provides the electrode with a cohesion and an adherence to the support which are maintained throughout its lifetime.

In one embodiment of the anode, the active material is a carbon-containing material selected from graphite, coke and vitreous carbon. The active material can be in the form of grains or fibers.

The present invention also provides a method of manufacturing the anode, comprising the following steps:

dissolving the binder in a solvent selected from water, an alcohol, N-methylpyrrolidone (NMP), and mixtures thereof, forming a paste by adding the active material to the dissolved binder, depositing the paste on the support to form the anode, drying the anode until the solvent is completely evaporated off.

The paste is formed from a mixture of the active material in powder form and the polymer solution. The support is preferably a thin metal strip enabling thin electrodes to be produced. The paste is deposited by coating, spin-coating, or spray-coating depending on its viscosity. A drying step is necessary in order to evaporate off the solvent. The electrode is then rolled one or more times to obtain the desired porosity and thickness.

In a variation, a paste is formed by adding the active material and a cross-linking agent to the dissolved binder. The cross-linking agent is preferably selected from isocyanates, acid anhydrides, polyamines, melamine derivatives, epoxides, and epichlorhydrin.

In a first implementation, the binder is polyvinyl alcohol (PVA) and the solvent is selected from water and a water-alcohol mixture. When very hydrolyzed, PVA is only soluble in water; when it is less hydrolysed it can be dissolved in a hydroalcoholic solution.

In a second implementation, the binder is polyvinyl butyral (PVB) and the solvent is alcohol. PVB is insoluble in water but soluble in alcohols.

In a third implementation, the binder is a copolymer of polyvinyl butyral (PVB) and polyvinyl alcohol (PVA) and the solvent is a water-alcohol mixture.

A PVA-PVB mixture can readily be used in a water-alcohol mixture.

The anode of the invention has the advantage of being easy to manufacture on an industrial scale. Its manufacture uses non toxic, volatile solvents which are safer to use than the usual solvents, and recycling becomes unnecessary. The invention means that cell manufacturers can have access to a lithium anode which is easily and cheaply manufactured and which has high performance throughout its lifetime.

Other features and advantages of the present invention become clear on reading the following non limiting examples, given by way of illustration, with reference to the accompanying drawings.

BRIEF DESCRIPTION OF THE DRAWINGS

In FIGS. 1 to 3, the anode potential E, in volts with respect to lithium, is shown as the ordinate, and the anode capacity per unit mass C, in mAh/g, is shown as the abscissa.

EXAMPLE 1

Prior Art

A prior art anode was produced from a mixture of 90% by weight of highly crystalline natural graphite carbon material containing 10% of PVDF, coated onto a nickel grid. The anode was then assembled in a button type rechargeable cell of format CR 2430 (diameter 24 mm, thickness 3 mm) with a cobalt oxide cathode.

The lithiated oxide cathode was designed to have an excess capacity in order to be able to observe the phenomena occurring at the anode. Between the electrodes, there was placed a microporous polyethylene separator as sold by Celanese Corporation under the trade name "Celgard 2502", and an electrolyte was added which comprised a mixture of solvents and a lithium salt. The solvent mixture was composed of one part by weight of ethylene carbonate EC and one part by weight of dimethyl carbonate DMC. The lithium salt was lithium trifluoromethanesulfonimide, LiTFSI (LiN(CF$_3$SO$_2$)$_2$), which was added at a concentration of 1M.

Figure 1:
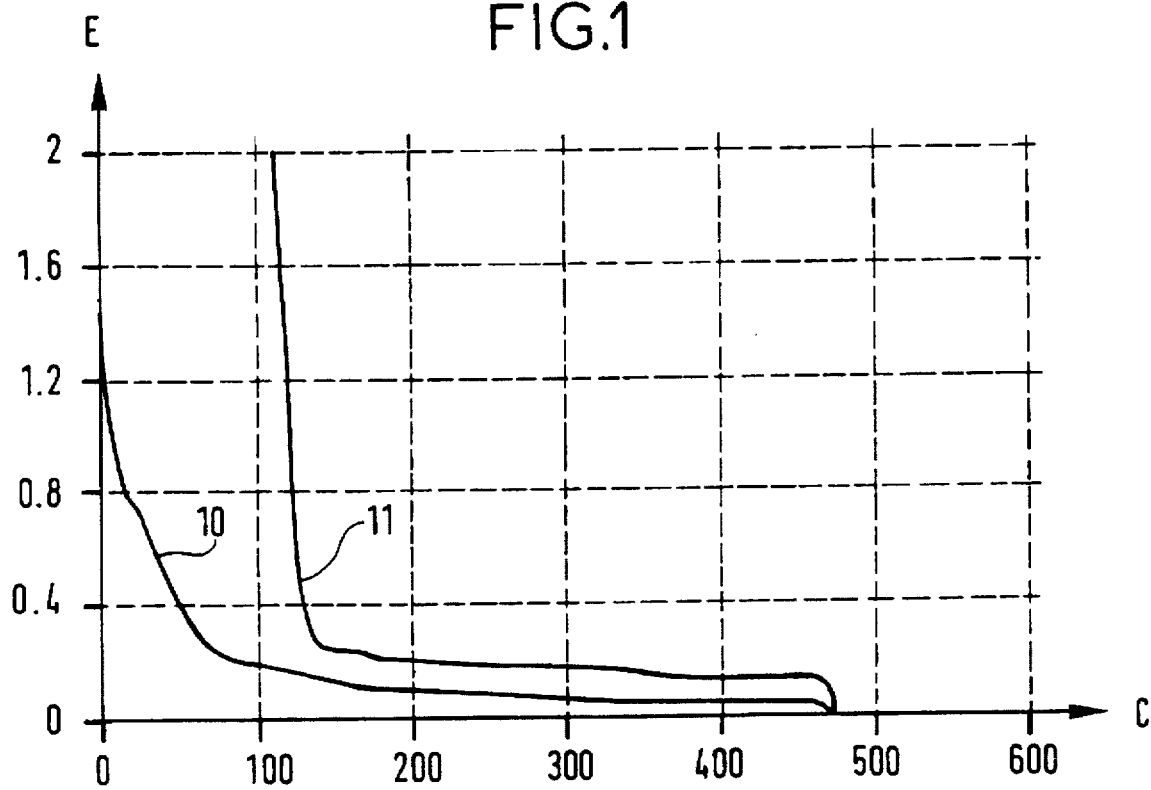
FIG. 1 shows an intercalation and deintercalation curve for lithium in a prior art anode in a rechargeable cell.

The cell was then tested at room temperature at 20 mA/g of carbon, charging to a potential of 4 volts (end of intercalation of lithium at 0 V/Li) and discharging to a potential of 2 volts (end of deintercalation of lithium at 2 V/Li). Curve 10 in FIG. 1 shows the first intercalation of lithium into a prior art anode followed by deintercalation as shown in curve 11. The discharged capacity per unit mass was of the order of 350 mAh/g.

EXAMPLE 2

A rechargeable cell analogous to that of Example 1 was produced, with the exception that it contained an anode in accordance with the present invention prepared from a mixture of 90% by weight of highly crystalline natural graphite carbon material with 10% of polyvinyl alcohol (PVA) coated on a nickel grid.

Figure 2:
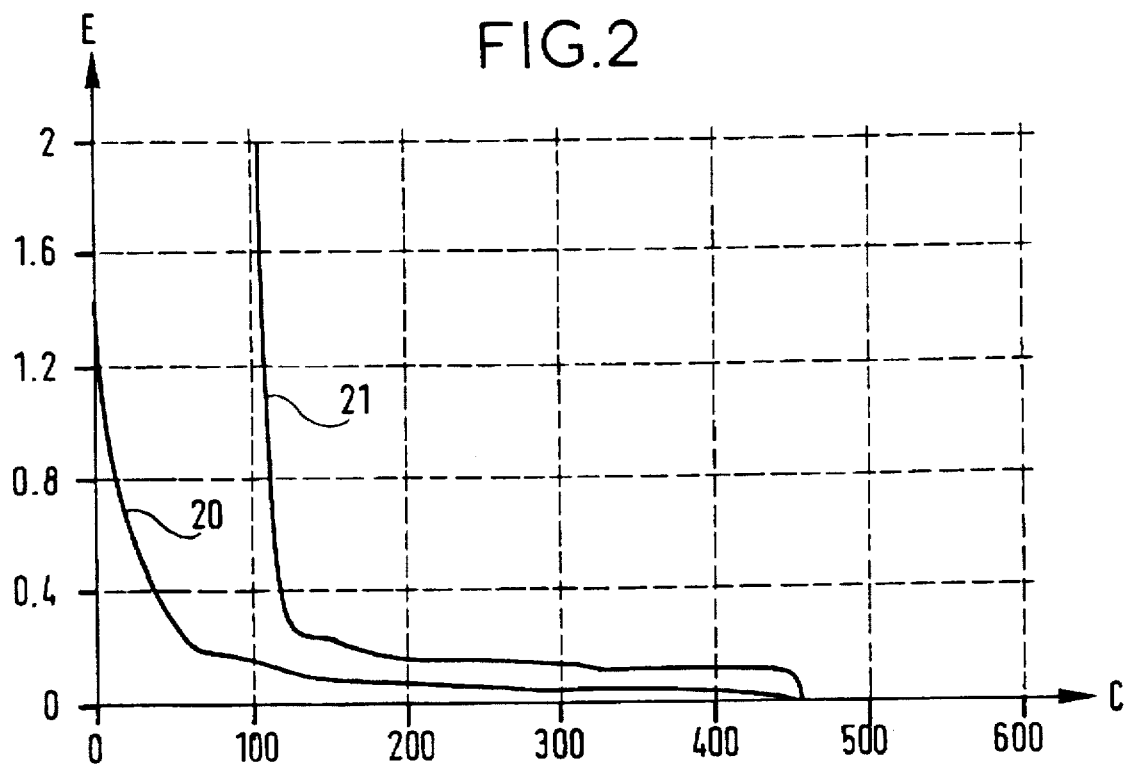
FIG. 2 is analogous to FIG. 1 for a first anode in accordance with the invention.

The cell was then tested under the same conditions as in Example 1. Curve 20 in FIG. 2 shows the first intercalation of lithium into an anode of the invention followed by deintercalation as shown in curve 21. The discharged capacity per unit mass was of the order of 354 mAh/g.

EXAMPLE 3

A rechargeable cell analogous to that of Example 1 was produced, with the exception that it contained an anode in accordance with the present invention prepared from a mixture of 90% by weight of highly crystalline natural graphite carbon material with 10% of a copolymer of polyvinyl butyral (PVB) and polyvinyl alcohol (PVA) containing 20% by weight of PVA, coated onto a nickel grid.

Figure 3:
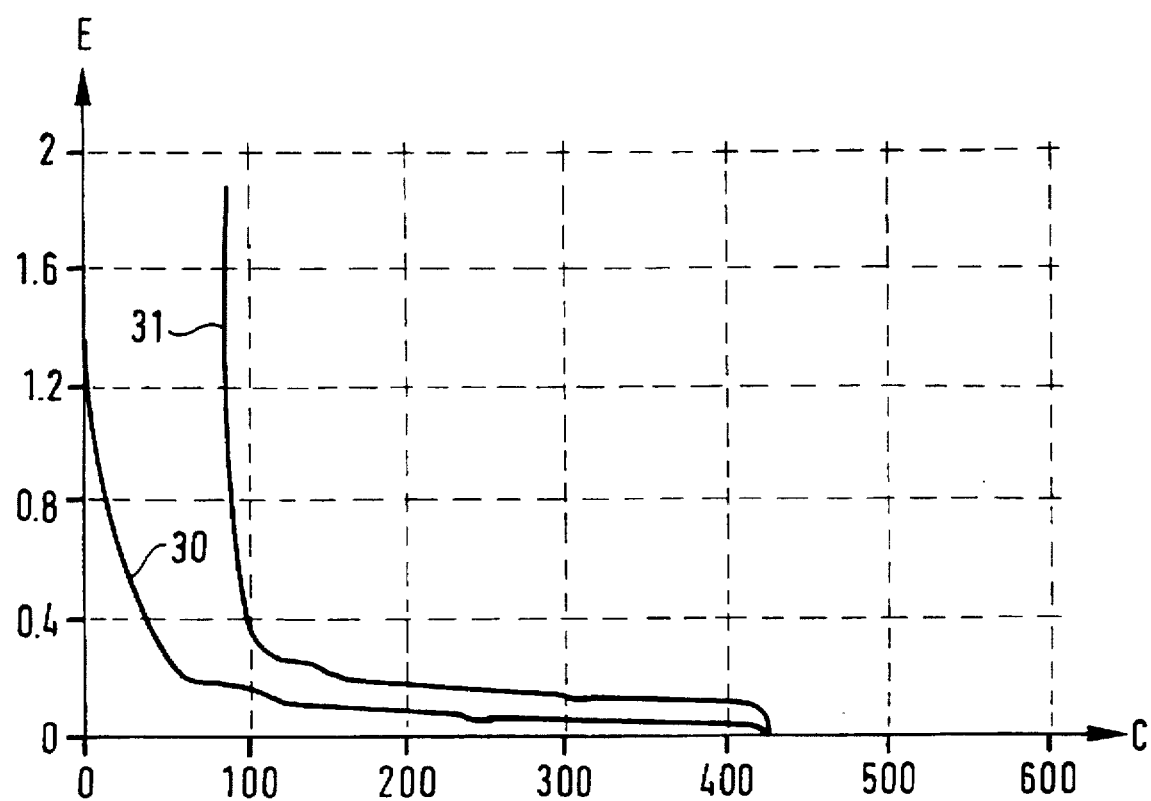
FIG. 3 is analogous to FIG. 1 for a second anode in accordance with the invention.

The cell was then tested under the same conditions as in Example 1. Curve 30 in FIG. 3 shows the first intercalation of lithium into an anode of the invention followed by deintercalation as shown in curve 31. The discharged capacity per unit mass was of the order of 338 mAh/g.

The present invention is not, of course, limited to the described embodiments but can be varied in a number of ways which are accessible to the skilled person without departing from the spirit of the invention.

We claim:

1. An anode for a rechargeable lithium cell, comprising:
   (a) a conductive support and
   (b) a layer comprising:
      an electrochemically active material forming a host structure into which lithium inserts itself and frees itself during cycling, and a polymer binder selected from the group consisting of polyvinyl alcohol, polyvinyl butyral, polyvinyl alcohol/polyvinyl butyral copolymers and polyvinyl alcohol/polyvinyl butyral mixtures.

2. An anode according to claim 1, in which said binder is a copolymer of polyvinyl alcohol and polyvinyl butyral in which the polyvinyl alcohol is present in the range 5% to 30% by weight.

3. An anode according to claim 1, in which said binder is present in the range 1% to 50% by weight of said layer.

4. An anode according to claim 3, wherein said binder is present in the range 5% to 20% by weight.

5. An anode according to claim 1, in which said active material is a carbon material selected from, the group consisting of graphite, coke and vitreous carbon.

6. An anode according to claim 1, wherein the host structure is lithium-containing.

7. An anode according to claim 1, wherein the anode has been cycled.

8. An anode according to claim 1, wherein the binder is polyvinyl alcohol.

9. The anode according to claim 1, wherein the binder is polyvinyl butyral.

10. The anode according to claim 1, wherein the binder is a polyvinyl alcohol/polyvinyl butyral copolymer.

11. The anode according to claim 1, wherein the binder is a of mixture of polyvinyl alcohol and polyvinyl butyral.

12. A method of manufacturing an anode for a rechargeable lithium cell, comprising the following steps:
   (a) dissolving a polymer binder selected from the group consisting of polyvinyl alcohol, polyvinyl butyral, polyvinyl alcohol/polyvinyl butyral copolymers and polyvinyl alcohol/polyvinyl butyral mixtures, in a solvent selected from the group consisting of water, an alcohol, N-methylpyrrolidone, and mixtures thereof, to give a dissolved binder solution;

(b) adding an electrochemically active material forming a host structure into which lithium inserts itself and frees itself during cycling to the dissolved binder solution, to form a paste;

(c) depositing said paste on a conductive support; and (d) drying said support with said paste thereon until said solvent is evaporated off.

13. A method according to claim 12, in which a paste is formed by adding said active material and a cross-linking agent to said binder in solution.

14. A method according to claim 13, in which said crosslinking agent is selected from the group consisting of isocyanates, acid anhydrides, polyamines, melamine and compound containing melamine groups, epoxides, and epichlorhydrin.

15. The method of claim 13, in which the crosslinking agent is an isocyanate.

16. The method of claim 13, in which the crosslinking agent is an acid anhydride.

17. The method of claim 13, in which the crosslinking agent is a polyamine.

18. The method of claim 13, in which the crosslinking agent is a melamine derivative.

19. The method of claim 13, in which the crosslinking agent is an epoxide.

20. The method of claim 13, in which the crosslinking agent is epichlorhydrin.

21. A method according to claim 12, in which said binder is polyvinyl alcohol and said solvent is selected the group consisting of from water and a water-alcohol mixture.

22. A method according to claim 12, in which said binder is polyvinyl butyral and said solvent is an alcohol.

23. A method according to claim 12, in which said binder is a copolymer of polyvinyl butyral and polyvinyl alcohol and said solvent is a water-alcohol mixture.

24. An anode for a rechargeable lithium cell, formed by a method comprising the steps of:

(a) dissolving a polymer binder selected from the group consisting of polyvinyl alcohol, polyvinyl butyral, polyvinyl alcohol/polyvinyl butyral copolymers and polyvinyl alcohol/polyvinyl butyral mixtures, in a solvent selected from the group consisting of water, an alcohol, N-methylpyrrolidone, and mixtures thereof, to give a dissolved binder solution;

(b) adding an electrochemically active material comprising a host structure into which lithium inserts itself and frees itself during cycling to the dissolved binder solution, to form a paste;

(c) depositing said paste on a conductive support; and (d) drying said support with said paste thereon until said solvent is evaporated off.

25. An anode according to claim 24 wherein the polymer binder is polyvinyl alcohol.

26. An anode according to claim 24 wherein the polymer binder is polyvinyl butyral.

27. An anode according to claim 24 wherein the polymer binder is a polyvinyl alcohol/polyvinyl butyral copolymer.

28. An anode according to claim 24 wherein the polymer binder is a polyvinyl alcohol/polyvinyl butyral mixture.

* * * * *